US006916866B2

(12) United States Patent
Joachimi et al.

(10) Patent No.: US 6,916,866 B2
(45) Date of Patent: Jul. 12, 2005

(54) LASER-ABSORBING MOLDING COMPOSITIONS WITH LOW CARBON BLACK CONTENTS

(75) Inventors: Detlev Joachimi, Krefeld (DE); Thomas Braig, Düsseldorf (DE); Martin Döbler, Düsseldorf (DE); Frank Krause, Bergisch Gladbach (DE); Frederik Thoma, Kamp-Lintfort (DE)

(73) Assignee: Bayer Aktiengesellschaft, Leverkusen (DE)

( * ) Notice: Subject to any disclaimer, the term of this patent is extended or adjusted under 35 U.S.C. 154(b) by 279 days.

(21) Appl. No.: 10/273,526

(22) Filed: Oct. 18, 2002

(65) Prior Publication Data

US 2003/0130381 A1 Jul. 10, 2003

(30) Foreign Application Priority Data

Oct. 24, 2001 (DE) .......................... 101 51 847

(51) Int. Cl.$^7$ ................................ C08K 5/34
(52) U.S. Cl. ..................... 524/88; 524/424; 524/495; 524/599; 524/606
(58) Field of Search .................. 524/88, 424, 495, 524/599, 606

(56) References Cited

U.S. PATENT DOCUMENTS

| | | | |
|---|---|---|---|
| 2,991,273 A | 7/1961 | Hechelhammer et al. ...... 260/47 |
| 2,999,835 A | 9/1961 | Goldberg ...................... 260/42 |
| 2,999,846 A | 9/1961 | Schnell et al. ................ 260/47 |
| 3,022,272 A | 2/1962 | Schnell et al. ................ 260/47 |
| 3,028,635 A | 4/1962 | Herubel ........................ 19/129 |
| 3,062,781 A | 11/1962 | Bottenbruch et al. ......... 260/47 |
| 3,148,172 A | 9/1964 | Fox ............................. 260/47 |
| 3,189,662 A | 6/1965 | Vaughn, Jr. .................. 260/824 |
| 3,271,367 A | 9/1966 | Schnell et al. ................ 260/49 |
| 3,288,864 A | 11/1966 | Farnham ..................... 260/619 |
| 3,419,634 A | 12/1968 | Vaughn, Jr. .................. 260/824 |
| 3,442,864 A | 5/1969 | Magee ........................ 260/67 |
| 3,692,744 A | 9/1972 | Rich et al. ................ 260/75 T |
| 3,737,409 A | 6/1973 | Fox ............................. 260/49 |
| 3,821,325 A | 6/1974 | Merritt, Jr. et al. ..... 260/824 R |
| 3,832,419 A | 8/1974 | Merritt, Jr. .............. 260/824 R |
| 3,879,348 A | 4/1975 | Serini et al. ........... 260/47 XA |
| 4,136,089 A | 1/1979 | Bier et al. ................... 528/309 |
| 4,176,224 A | 11/1979 | Bier et al. ................... 528/309 |
| 4,334,106 A | 6/1982 | Dai ............................ 568/719 |
| 4,605,607 A | 8/1986 | Nikles et al. ................ 430/17 |
| 4,982,014 A | 1/1991 | Freitag et al. ............... 568/721 |
| 5,216,428 A | 6/1993 | DuFort ....................... 528/196 |
| 5,227,458 A | 7/1993 | Freitag et al. ............... 528/196 |
| 5,340,905 A | 8/1994 | Kühling et al. ............. 528/199 |
| 5,399,659 A | 3/1995 | Kühling et al. ............. 528/199 |
| 5,605,945 A | 2/1997 | Sayed et al. ................ 523/440 |
| 5,783,651 A | 7/1998 | König et al. ................. 528/21 |
| 5,893,959 A | 4/1999 | Muellich ................. 156/272.8 |
| 6,656,315 B2 | 12/2003 | Sallavanti et al. ....... 156/272.8 |
| 6,777,156 B1 * | 8/2004 | Goto et al. ............... 430/270.1 |
| 2002/0002225 A1 | 1/2002 | Reil ........................... 524/358 |
| 2002/0056707 A1 | 5/2002 | Pinho et al. ........... 219/212.64 |
| 2003/0196761 A1 | 10/2003 | Sallavanti et al. ....... 156/380.9 |

FOREIGN PATENT DOCUMENTS

| | | |
|---|---|---|
| CA | 1076739 | 4/1980 |
| CA | 2305147 | 4/1999 |
| DE | 44 25 861 | 1/1996 |
| DE | 197 44 162 | 4/1999 |
| DE | 199 16 786 | 10/2000 |
| DE | 199 60 104 | 6/2001 |
| GB | 1 367 790 | 9/1974 |
| JP | 11-170371 | 6/1999 |
| WO | 98/17720 | 4/1998 |

OTHER PUBLICATIONS

Methoden der Organischen Chemie, Houben–Weyl, vol. 14/1, month unavailable, 1961, pp. 392–406, H. Logemann, "Allegemeines zur Polymerisation in heterogener Phase".

J. of Polymers Science & Eng., vol. 11, $2^{nd}$ ed. month unavailable 1988, pp. 648–718, "Polycarbonates".

Kunststoffe, 88, (month unavailable) 1998, pp. 210–212, D. Hänsch et al, Harte und weiche Kunststoffe mit Diodenlaser verbinden.

Kunststoffe 87 month unavailable 1997, 3, pp. 348–350, H. Potente et al, "Laser–Durchstrahlschweißen von PE–HD".

Kunststoffe 87 month unavailable 1997, 11, pp. 1632–1640, F. Becker et al, "Trends bei Serien–schweißverfahren".

Kunststoffe Handbuch, vol. 3/1, month unavailable 117–174, U. Grigo et al, Polycarbonate.

Kunststoffe, 91, month unavailable 2001, 7, pp. 100–102, Stefan Schulten et al, "Laser–geschweißter Luftsammler".

J. of Polymer Science, Polymer Chemistry Edition, vol. 18, month unavailable 1980, pp. 75–90, D.C. Prevorsek et al, "Synthesis of Poly(ester Carbonate) Copolymers".

Polymer Reviews, vol. 9, month unavailable 1964, pp. 31–99, Hermann Schnell, Chemistry and Physics of Polycarbonates.

Plastverarbeiter, 46, month unavailable 1995, Nr. 9, pp. 42–56, H. Potente et al, "Laserschweißen von Thermoplasten".

Plastverarbeiter, 50, month unavailable 1999, Nr. 4, pp. 18–19, "Berührungslos, schnell und sauber".

Database WPI Section Ch, Week 200222 Derwent Publications Ltd., London, GB; AN 2002–167363 XP002229154 & JP 2001 302872 A (Toray Ind Inc), Oct. 31, 2001 Zusammenfassung.

* cited by examiner

Primary Examiner—Kriellion A. Sanders
(74) Attorney, Agent, or Firm—Jill Denesvich

(57) ABSTRACT

The present invention relates to natural-colored and pigmented thermoplastic molding compositions and molded parts fabricated therefrom that are laser-absorbing at least in partial spectral regions of the wavelength range from 700 to 1200 nm and that can be welded by laser beam welding and to molded parts that are transparent or translucent to laser light.

12 Claims, No Drawings

LASER-ABSORBING MOLDING COMPOSITIONS WITH LOW CARBON BLACK CONTENTS

FIELD OF THE INVENTION

The present invention relates to natural-colored and pigmented thermoplastic molding compositions and molded parts fabricated therefrom, which are laser-absorbing at least in regions of the spectrum in the wavelength range from 700 to 1200 nm. Further, the present invention relates to molding compositions that can be welded by laser beam welding and to molded parts that are transparent or translucent to laser light.

BACKGROUND OF THE INVENTION

Various processes exist for welding plastic molded parts, see for example, Kunststoffe 87, (1997), 11, 1632–1640. A prerequisite for a stable weld joint in heated element welding and vibration welding processes, such as used for vehicle manifold pipes, is a sufficient softening of the joining partners in the contact zone before the actual joining stage.

When pressing welding partners together, a decisive factor for the strength of the weld joint to be formed is that the applied pressure lies in a specific optimum range. The pressure should not be too great because too much melt can be forced out from the contact zone, but on the other hand, should not be too low because weak points can occur in the weld joint. This is due, inter alia, to the fact that with many technical parts that are welded to one another, a 100% fitting accuracy cannot be achieved. Although contact of the molded part halves, over the whole weld joint, can be achieved by applying a sufficiently high compressive force, the local different pressure conditions may lead to a variously large outflow of melt from the weld joint and thus to locally variously high strengths. The problem can be alleviated by, for example, increasing the melt viscosity, as disclosed in EP-A 0 685 528, resulting in a reduced outflow of the melt from the joining zone.

As an alternative method to vibration welding and heated element welding, laser beam welding, in particular with diode lasers, has recently become increasingly widespread. The basic principle of laser beam welding of plastics is the absorption of radiation in the molding composition. Pure polymers are largely transparent or translucent to laser radiation, i.e. they hardly absorb laser light in the wavelength range from 700 to 1200 nm, which is of interest in laser beam welding. The absorption and thus the conversion of laser light into heat can be controlled by the use of pigments, fillers, reinforcing substances and additives.

The basic principles of laser beam welding are described in the literature, see for example, Kunststoffe 87 (1997) 3, 348–350; Kunststoffe 88 (1998) 2, 210–212; Kunststoffe 87 (1997) 11, 1632–1640; Plastverarbeiter 50 (1999) 4, 18–19; and Plastverarbeiter 46 (1995) 9, 42–46.

A precondition for the use of laser beam welding is that the radiation emitted by the laser first passes through a joining partner that is sufficiently transparent to laser light at the wavelength that is employed, and is then absorbed by the second joining partner in a thin layer of several 100 µm thick and is converted into heat that leads to the melting of the two joining partners in the contact zone and finally to the joining by a weld joint.

Amorphous polymers, such as, for example polycarbonates (PC), polystyrene (PS), poly(methyl methacrylate) (PMMA), as well as, partially crystalline thermoplastics materials such as, polyamides, polyamide 6 (PA6) and polyamide 66 (PA66), or polyesters, such as polybutylene terephthalate (PBT) and polyethylene terephthalate (PET) are largely transparent or laser-translucent in the wavelength range of the lasers that are normally used for thermoplastics welding (Nd:YAG-Laser: 1060 nm; high output diode laser: 800–1000 nm).

Where the expressions laser-transparent, laser-translucent and laser absorbing are used hereinafter, they refer to the wavelength range mentioned above. However, in the case where fillers or reinforcing substances are used with partially crystalline materials there is a more or less marked scattering of the laser light due to the partially crystalline morphology, therefore the diffuse transmission accounts for a large part of the overall transmission. The transparency falls with increasing diffuse transmission, and the corresponding test specimens or molded parts should then be described more accurately as laser-translucent. Molding compositions that are only laser-translucent will hereinafter also be described as laser-transparent molding compositions. The measurement of the transmission capacity for IR laser light is usually performed with the spectrophotometer and an integrating photometer bulb. This measurement arrangement also detects the diffuse portion of the transmitted radiation. The transmission capacity is measured not only at one wavelength, but in a spectral range that covers all laser wavelengths that are currently used for laser beam welding.

The transmission of laser light is impaired by constituents of the thermoplastic molding compositions that absorb the light of the corresponding wavelength. These are in particular carbon blacks, but also other dyes, pigments or fillers and reinforced substances, e.g. carbon fibers. For a successful technical use of laser beam welding for joining molded parts of thermoplastic molding compositions, a molding composition that absorbs laser radiation and a molding composition that is largely transparent to laser radiation is therefore preferred.

For laser-absorbing molding compositions, carbon black-containing molding compositions are used, for example, in the case of glass fiber-reinforced PA6 compounds. Such molding compositions are for example conventionally also used for manifold pipes in vehicle internal combustion engines that are joined by vibration welding or by heated element welding, see Kunststoffe 91, (2001), 7, 100–102.

If the absorption of the radiation takes place very near the surface, which in certain circumstances leads to a reduced weld joint strength, an improvement may possibly be achieved by reducing the carbon black concentration, see Kunststoffe 87, (1997), 3, 348–350.

EP-B 0 751 865 describes a process for laser beam welding in which a first workpiece part, having a transmission of greater than 60%, is welded to a second workpiece part, having a negligible transmission. The low transmission of the housing base is achieved by pigmenting with dyes in an amount of 1% to 2%, and for the housing cover, is achieved with a lower coloring agent concentration, possibly also without the use of pigments. The specification does not describe which pigments or coloring agents are suitable.

DE-A 199 60 104 describes how two or more dark-colored molded parts can be joined to one another by laser beam welding. For example, dark to black molded parts that are colored with combinations of coloring agents that do not absorb in the near IR region of the laser welding are welded to molded parts containing coloring agents, in the simplest case carbon black, that absorb in the near IR region of the laser welding.

EP-A 1 029 650 describes the use of laser-transparent polyester molding compositions that are colored black by combinations of yellow and violet coloring agents, for laser beam welding with laser-absorbing polyester molding compositions.

The use of laser beam welding for the production of containers with cylindrical or similar cross-sections is described in DE-A 19 916 786. WO-A 2000/66346 describes the use of laser beam welding in the production of, inter alia, synthetic carpets, while further applications include welded tubing, as described in DE-A 44 25 861, or the joining of sheets or films, as described in JP-A 11170371.

In principle, the combination of, for example, non-colored glass fiber-reinforced molding compositions as a laser-transparent partner with a molding composition based on the same polymer colored by means of carbon black as laser-absorbing partner is therefore one possible way of producing a solid joint between two molded parts.

The use of black thermoplastic molding compositions, colored with carbon black as the laser-absorbing partner in laser beam welding is however, not possible for many applications. This relates to applications in which a certain transparency or translucency of the corresponding molded parts is necessary. For such applications as containers for servomechanism oil, brake fluid, coolants, etc., non-colored thermoplastics materials are generally used. However, the non-colored thermoplastic materials cannot be employed as laser-absorbing welding partners in laser beam welding due to their laser translucency. Also, the use of carbon black as the "laser absorber" is generally not possible in light colorations. Although in this case no transparency or translucency of the molded parts is desired, nevertheless there should as far as possible be no or only slight color differences between the joining partners.

One suggested solution for the welding of transparent light-colored molding compositions without change in color is disclosed in DE-A 19925203, which discloses the use of a welding additive from which a laser-absorbing substance is produced only by the application of, for example, electrical or thermal energy, which substance can then be converted again into the original laser-transparent substance during the welding process. The welding additive may be present as a film, sheet or wire in the joining zone or may be homogeneously distributed in the molded part that is to act as the absorbing joining partner. Although this process meets the object of achieving a discoloration-free welding of transparent joining partners, it is relatively complicated and potentially trouble-prone due to the additional process step involved in the production of the absorber before the welding. Specific examples that could demonstrate the applicability of the process to the welding of thermoplastics materials such as PA, PBT or PC are not given.

Combinations of joining partners that are pigmented in various colors represent a further special case. Here too a partner that is transparent to laser radiation and a partner that absorbs laser radiation are required. Thermoplastics materials that are colored with conventional coloring agents generally absorb only in one part of the visible spectrum and IR region of the spectrum however, with the result that they are generally not suitable or are only of limited suitability as laser-absorbing joining partners for laser beam welding.

The most commonly used coloring agent for coloring technical thermoplastics materials black is carbon black, in which carbon blacks are used that are produced by various processes and have different grain size distributions or specific surfaces. The use of carbon blacks for coloring materials black is significantly less expensive than organic or inorganic coloring agents.

However, in many cases coloring with carbon blacks or inorganic pigments has a negative effect on mechanical properties of technical thermoplastics materials, in particular on the toughness, measured for example as the Izod impact toughness according to ISO 180 1U. Here there is a need for laser-absorbing additives, in particular for those that enable the use of carbon black to be avoided completely or at least substantially, and that permit dark to black colorations with less impairment of the mechanical properties.

In many technical thermoplastics materials, e.g. in polyamide 6 and polyamide 66, carbon blacks also act as nucleating agents, i.e. the carbon black acts as a crystallization seed in the polyamide melt and thus promotes crystallization. Accelerated crystallization frequently leads to a deterioration of the surface quality, in particular in molded parts produced by the injection molding process. For this reason the lowest possible concentration of carbon black is often employed in thermoplastics molding compositions.

Therefore, the unrestricted coloring of the joining partners to be welded together by means of laser beam welding while at the same time preserving the best possible surface quality is desirable.

SUMMARY OF THE INVENTION

An object of the present invention is to provide natural-colored and pigmented laser-absorbing molding compositions for the production of molded parts having a high surface quality that can be reliably joined to laser-transparent molded parts by a laser beam process. Another object of the present invention is to provide a laser-absorbing material that is transparent or translucent in the visible region of the spectrum in layers up to 5 mm thick. A further object of the present invention, is to provide both molded parts that appear to the human eye to have a very similar optical appearance as regards color and surface quality.

It has now been found that by using compounds that strongly absorb in the infrared region or by a combination of these compounds with several non-black coloring agents in a thermoplastic molding composition, molded parts can be produced having a natural-colored, white, black or other color impression and with a very good surface quality, whose laser transmission can be adjusted in a precisely determined manner so that the said molded parts can be reliably welded to a laser-transparent joining partner.

DETAILED DESCRIPTION OF THE INVENTION

The present invention accordingly provides compositions containing

A) 35 to 99.999 wt. %, preferably 45 to 99.995 wt. %, of a laser-transparent thermoplastic material B) 0.001 to 0.1, preferably 0.002 to 0.07, more preferably 0.004 to 0.05 wt. % of one or more IR-absorbing compounds selected from the group comprising phthalocyanines, naphthalocyanines, perylenes, quaterylenes, metal complexes, azo dyes, anthraquinones, squaric acid derivatives, immonium dyes and polymethines C) 0 to 70, preferably 5 to 55, more preferably 10 to 40 wt. % of a mineral filler and/or reinforcing substance D) 0 to 30 wt. %, preferably 0.1 to 20 wt. % of conventional additives such as processing auxiliary substances, nucleating agents, stabilizers, flame retardants and elastomer modifiers, wherein the total composition has a carbon black content of less than 0.1 wt. %, preferably less than 0.05 wt. % and more preferably less than 0.01 wt. %.

As Component A, all laser-transparent thermoplastic materials may be used according to the present invention. Laser-transparent thermoplastic materials are understood, according to the present invention, to mean plastics materials that have a laser transmission of greater than 5%, preferably greater than 10% and more preferably greater than 15% in the wavelength range from 700 to 1200 nm or in parts of this spectral range in layer thicknesses of 0.4 to 6 mm, preferably 0.5 to 5 mm and particularly preferably 0.6 to 3.5 mm without addition of coloring agents. Suitable as component A, according to the present invention, are polyamides, thermoplastic polyesters, polycarbonates, polystyrenes (including syndiotactic polystyrene) and/or polyolefins and/or mixtures thereof.

Suitable as component A are polymers or copolymers, for example based on partially aromatic polyesters such as for example polyalkylene terephthalates, aromatic polyesters, polyamide, polycarbonate, polyacrylate, polymethacrylate, ABS graft polymers, polyolefins such as polyethylene or polypropylene, polystyrene, polyvinyl chloride, polyoxymethylene, polyimides, polyethers and polyether ketones, which may be used individually or as a blend of various polymers.

Polyamides are preferably used as component A. The polyamides, according to the present invention, may be produced according to various methods and synthesized from widely different building blocks, and in a special application case may be processed alone or in combination with processing auxiliary substances, stabilizers, polymeric alloying partners, such as elastomers or also reinforcing materials, such as, for example mineral fillers or glass fibers, into materials having specially adjusted property combinations. Also suitable are blends with proportions of other polymers, for example polyethylene, polypropylene, ABS, in which optionally one or more compatibility improvers may be employed. The properties of the polyamides can be improved by adding elastomers, for example having regard to the impact strength of for example reinforced polyamides. The large number of possible combinations enables a very large number of products to be obtained having widely differing properties.

A large number of process procedures have become known for the production of polyamides, in which different monomer building blocks, various chain regulators for adjusting a desired molecular weight or also monomers having reactive groups for subsequently intended post-treatments may be employed depending on the desired end product.

The technically relevant processes for producing polyamides generally take place via polycondensation in the melt. The hydrolytic polymerization of lactams is also understood as polycondensation within this context.

Preferred polyamides are partially crystalline polyamides that may be produced from diamines and dicarboxylic acids and/or lactams with at least 5 ring members or corresponding amino acids.

Suitable as starting products are aliphatic and/or aromatic dicarboxylic acids such as adipic acid, 2,2,4-trimethyladipic acid and 2,4,4-trimethyladipic acid, azeleic acid, sebacic acid, isophthalic acid, terephthalate acid, aliphatic and/or aromatic diamines such as for example tetramethylenediamine, hexamethylenediamine, 1,9-nonane-diamine, 2,2,4-trimethylhexamethylenediamine and 2,4,4-trimethylhexamethylene-diamine, the isomeric diaminodicyclohexylmethanes, diaminodicyclohexylpropanes, bis-aminomethylcyclohexane, phenylenediamines, xylylenediamines, amino-carboxylic acids such as for example aminocaproic acid and/or the corresponding lactams. Copolyamides of several of the aforementioned monomers are also suitable.

Caprolactams are particularly preferred, and F-caprolactam is particularly preferably preferred.

Also suitable are most compounds based on PA6, PA66 and other aliphatic and/or aromatic polyamides and/or copolyamides, in which 3 to 11 methylene groups are present on one polyamide group in the polymer chain.

The polyamides produced according to the present invention may also be used in a mixture with other polyamides and/or further polymers.

Partially aromatic polyesters may also preferably be used as component A. The partially aromatic polyesters according to the present invention are selected from the group comprising derivatives of polyalkylene terephthalates, preferably selected from polyethylene terephthalates, polytrimethylene terephthalates and polybutylene terephthalates, more preferably polybutylene terephthalate, and most preferably polybutylene terephthalate.

The expression partially aromatic polyesters is understood to mean materials that also contain aliphatic molecule parts in addition to aromatic molecule parts.

Polyalkylene terephthalates within the context of the present invention are the reaction products of aromatic dicarboxylic acids or their reactive derivatives, such as dimethyl esters or anhydrides, and aliphatic, cycloaliphatic or araliphatic diols and mixtures of these reaction products.

Preferred polyalkylene terephthalates can be produced from terephthalic acid, or its reactive derivatives, and aliphatic or cycloaliphatic diols with 2 to 10 C atoms according to known methods, as described in (Kunststoff-Handbuch, Vol. VIII, p. 695 to p. 840, Karl-Hanser Verlag, Munich, 1973.

Preferred polyalkylene terephthalates containing at least 80 mole %, preferably 90 mole % referred to the dicarboxylic acid, of terephthalic acid radicals, and at least 80 mole %, preferably at least 90 mole %, referred to the diol component, of ethylene glycol radicals and/or propanediol-1,3 and/or butanediol-1,4 radicals.

The preferred polyalkylene terephthalates may in addition to terephthalic acid esters contain up to 20 mole % of radicals of other aromatic dicarboxylic acids with 8 to 14 C atoms or aliphatic dicarboxylic acids with 4 to 12 C atoms, such as radicals of phthalic acid, isophthalic acid, naphthalene-2,6-dicarboxylic acid, 4,4'-diphenyl-dicarboxylic acid, succinic acid, adipic acid, sebacic acid, azelaic acid, cyclohexane-diacetic acid and cyclohexanedicarboxylic acid.

The preferred polyalkylene terephthalates may in addition to ethylene glycol radicals and/or propanediol-1,3-glycol radicals and/or butanediol-1,4-glycol radicals contain up to 20 mole % of other aliphatic diols with 3 to 12 C atoms or cycloaliphatic diols with 6 to 21 C atoms, for example radicals of propanediol-1,3, 2-ethylpropanediol-1,3, neopentyl glycol, pentanediol-1,5, hexanediol-1,6, cyclohexanedimethanol-1,4, 3-methylpentanediol-2,4, 2-methylpentanediol-2,4, 2,2,4-trimethylpentanediol-1,3 and -1,6,2-ethylhexanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4- hydroxypropoxyphenyl)-propane, as disclosed in DE-A 24 07 674, 24 07 776 and 27 15 932.

The polyalkylene terephthalates may be branched by incorporating relatively small amounts of trihydric or tetrahydric alcohols or tribasic or tetrabasic carboxylic acids, such as described, for example, in DE-A 19 00 270 and in U.S. Pat. No. 3,692,744. Examples of preferred branching agents include trimesic acid, trimellitic acid, trimethylolethane and trimethylolpropane, and pentaerythritol.

More preferred are polyalkylene terephthalates that have been produced solely from terephthalic acid and its reactive derivatives, such as its dialkyl esters, and ethylene glycol and/or propanediol-1,3 and/or butanediol-1,4, such as, polyethylene terephthalate and polybutylene terephthalate, and mixtures of these polyalkylene terephthalates.

Preferred polyalkylene terephthalates are also copolyesters that are produced from at least two of the acid components mentioned above and/or from at least two of the alcohol components mentioned above; more preferred copolyesters are poly-(ethylene glycol/butanediol-1,4)-terephthalates.

The polyalkylene terephthalates generally have an intrinsic viscosity of ca. 0.4 to 1.5, preferably 0.5 to 1.3, in each case measured in phenol/o-dichlorobenzene (1:1 parts by weight) at 25° C.

The polyesters produced according to the present invention may also be used mixed with other polyesters and/or further polymers.

As component A) the compositions according to the present invention may preferably also contain a polycarbonate or a mixture of polycarbonates.

Preferred polycarbonates are those homopolycarbonates and copolycarbonates based on bisphenols of the general formula (I),

HO-Z-OH  (I)

wherein Z is a divalent organic radical with 6 to 30 C atoms that contains one or more aromatic groups.

Preferred are bisphenols of the formula (Ia)

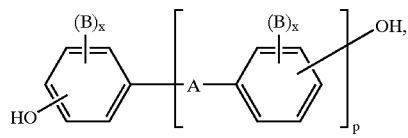

(Ia)

wherein

A denotes a single bond, $C_1$–$C_5$-alkylene, $C_2$–$C_5$-alkylidene, $C_5$–$C_6$-cycloalkylidene, —O—, —SO—, —CO—, —S—, $SO_2$—, $C_6$–$C_{12}$-arylene, on which further aromatic rings optionally containing heteroatoms may be condensed, or a radical of the formulae (II) or (III)

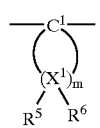

(II)

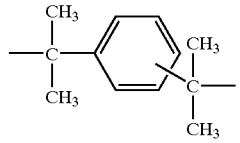

(III)

wherein

B in each case denotes $C_1$–$C_{12}$-alkyl, preferably methyl, or halogen, preferably chlorine and/or bromine x in each case independently of one another is 0, 1 or 2, p is 1 or 0, and $R^1$ and $R^2$, which may be chosen individually for each $X^1$, independently of one another denote hydrogen or $C_1$–$C_6$-alkyl, preferably hydrogen, methyl or ethyl, $X^1$ is carbon, and m is an integer from 4 to 7, preferably 4 or 5, with the proviso that on at least one atom $X^1$, $R^1$ and $R^2$ are simultaneously alkyl.

Examples of bisphenols according to the general formula (I) include bisphenols belonging to the following groups: dihydroxydiphenyls, bis-(hydroxyphenyl)-alkanes, bis-(hydroxyphenyl)-cycloalkaries, indane bisphenols, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides and α,α'-bis-(hydroxyphenyl)-diisopropylbenzenes.

Derivatives of the aforementioned bisphenols that can be obtained for example by alkylation or halogenation on the aromatic rings of the aforementioned bisphenols are also examples of bisphenols according to the general formula (I).

Examples of bisphenols according to the general formula (I) include the following compounds: hydroquinone, resorcinol, 4,4'-dihydroxydiphenyl, bis-(4-hydroxyphenyl)-sulfide, bis-(4-hydroxyphenyl)-sulfone, bis-(3,5-dimethyl4-hydroxyphenyl)-methane, bis-(3,5-dimethyl-4-hydroxyphenyl)-sulfone, 1,1-bis-(3,5-dimethyl-4-hydroxyphenyl)-p/m-diisopropylbenzene, 1,1-bis-(4-hydroxyphenyl)-1-phenylethane, 1,1-bis-(3,5-dimethyl-4-hydroxyphenyl)-cyclohexane, 1,1-bis-(4-hydroxy)-3-methylcyclohexane, 1,1-bis-(4-hydroxyphenyl)-3,3-dimethyl-cyclohexane, 1,1-bis-(4-hydroxyphenyl)-4-methylcyclohexane, 1,1-bis-(4-hydroxyphenyl)-cyclohexane, 1,1-bis-(4-hydroxyphenyl)-3,3,5-trimethylcyclo-hexane, 2,2-bis-(3,5-dichloro-4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(4-hydroxyphenyl)-propane, (i.e. bisphenol A), 2,2-bis-(3-chloro4-hydroxyphenyl)-propane, 2,2-bis-(3,5-dibromo-4-hydroxyphenyl)-propane, 2,4-bis-(4-hydroxyphenyl)-2-methylbutane, 2,4-bis-(3,5-dimethyl-4-hydroxyphenyl)-2-methylbutane, α,α'-bis-(4-hydroxyphenyl)-o-diisopropylbenzene, α,α'-bis-(4-hydroxyphenyl)-m-diisopropylbenzene (i.e. bisphenol M), α,α'-bis-(4-hydroxyphenyl)-p-diisopropylbenzene and indane bisphenol.

More preferred polycarbonates are the homopolycarbonate based on bisphenol A, the homopolycarbonate based on 1,1-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane.

The above-described bisphenols according to the general formula (I) may be produced by known methods, for example from the corresponding phenols and ketones.

The above-described bisphenols and processes for their production are described for example in the monograph by H. Schnell, "Chemistry and Physics of Polycarbonates", Polymer Reviews, Vol. 9, pp. 77–98, Interscience Publishers, New York, London, Sydney, 1964 and in U.S. Pat. Nos. 3,028,635, 3,062,781, 2,999,835, 3,148,172, 2,991,273, 3,271,367, 4,982,014, 2,999,846, in DE-A 1 570 703, in DE-A 2 063 050, in DE-A 2 036 052, in DE-A 2 211 956, in DE-A 3 832 396 and in FR-A 1 561 518 as well as in Japanese application nos. 62039/1986, 62040/1986 and 105550/1986.

1,1-bis-(4-hydroxyphenyl)-3,3,5-trimethylcyclohexane and its production is described for example in U.S. Pat. No. 4,982,014.

Indane bisphenols and their production are described for example in U.S. Pat. No. 3,288,864, in JP-A 60 035 150 and in U.S. Pat. No. 4,334,106. Indane bisphenols may for example be produced from isopropenylphenol or its derivatives or from dimers of isopropenylphenol or its derivatives in the presence of a Friedel-Craft catalyst in organic solvents.

Polycarbonates may be produced by known processes. Suitable processes for the production of polycarbonates include for example production from bisphenols with phosgene according to the interface polymerization process or from bisphenols with phosgene according to the homogeneous phase process, the so-called pyridine process, or from bisphenols with carbonic acid esters according to the melt transesterification process. These production processes are described for example in H. Schnell, "Chemistry and Physics of Polycarbonates", Polymer Reviews, Vol. 9, pp. 31–76, Interscience Publishers, New York, London, Sydney, 1964. The above-mention production processes are also described in D. Freitag, U. Grigo, P. R. Müller, H. Nouvertne, "Polycarbonates" in Encyclopedia of Polymer Science and Engineering, Volume 11, Second Edition, 1988, pp. 648 to 718 and in U. Grigo, K. Kircher and P. R. Müller "Polycarbonate", in Becker, Braun, Kunststoff-Handbuch, Vol. 3/1, Polycarbonate, Polyacetale, Polyester, Celluloseester, Carl Hanser Verlag, Munich, Vienna 1992, pp. 117 to 299 and in D.C. Prevorsek, B. T. Debona and Y. Kesten, Corporate Research Center, Allied Chemical Corporation, Morristown, N.J. 07960, "Synthesis of Poly (Ester Carbonate) Copolymers" in Journal of Polymer Science, Polymer Chemistry Edition, Vol. 19, 75–90 (1980).

The melt transesterification process is described in particular in H. Schnell, "Chemistry and Physics of Polycarbonates", Polymer Reviews, Vol. 9, pp. 44–51, Interscience Publishers, New York, London, Sydney, 1964 as well as in DE-A 1 031 512 and in U.S. Pat. No. 3,022,272, in U.S. Pat. No. 5,340,905 and in U.S. Pat. No. 5,399,659.

In the production of polycarbonates, raw materials and auxiliary substances containing only small amounts of impurities are preferably used. In particular, in the production according to the melt transesterification process the bisphenols and the carbonic acid derivatives that are used should as far as possible be free from alkali metal ions and alkaline earth metal ions. Such pure raw materials can be obtained for example by recrystallizing, washing or distilling the carbonic acid derivatives, for example carbonic acid esters, and the bisphenols.

The suitable polycarbonates according to the present invention preferably have a weight average molecular weight ($M_w$), which can be determined for example by ultracentrifugation or light scattering measurements, of 10,000 to 200,000 g/mole. Particularly preferably they have a weight average molecular weight of 12,000 to 80,000 g/mole, and most particularly preferably 20,000 to 35,000 g/mole.

The mean molecular weight of the polycarbonates according to the present invention may for example be adjusted in a known manner by adding an appropriate amount of chain terminators. The chain terminators may be used individually or as a mixture of various chain terminators.

Suitable chain terminators are monophenols as well as monocarboxylic acids. Suitable monophenols are for example phenol, p-chlorophenol, p-tert.-butylphenol, cumylphenol or 2,4,6-tribromophenol, as well as long-chain alkylphenols, such as for example 4-(1,1,3,3-tetramethylbutyl)-phenol or monoalkylphenols and/or dialkylphenols with a total of 8 to 20 C atoms in the alkyl substituents, such as for example 3,5-di-tert.-butylphenol, p-tert.-octylphenol, p-dodecylphenol, 2-(3,5-dimethylheptyl)-phenol or 4-(3,5-dimethylheptyl)-phenol. Suitable monocarboxylic acids are benzoic acid, alkylbenzoic acids and halogenated benzoic acids.

Preferred chain terminators are phenol, p-tert.-butylphenol, 4-(1,1,3,3-tetramethylbutyl)-phenol and cumylphenol.

The amount of chain terminators is preferably between 0.25 and 10 mole %, referred to the sum total of bisphenols used in each case.

The suitable polycarbonates according to the present invention may be branched in a known manner, and more specifically and preferably by the incorporation of trifunctional or higher than trifunctional branching agents. Suitable branching agents are for example those with three or more than three phenolic groups or those with three or more than three carboxylic acid groups.

Suitable branching agents are for example phloroglucinol, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tris-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)4-methylphenol, 2-(4-hydroxyphenyl)-2-(2,4-dihydroxyphenyl)-propane, hexa-(4-(4-hydroxyphenylisopropyl)-phenyl)-terephthalic acid ester, tetra-(4-hydroxyphenyl)-methane, tetra-(4-(4-hydroxyphenylisopropyl)-phenoxy)-methane and 1,4-bis-(4',4"-dihydroxytriphenyl)-methylbenzene, as well as 2,4-dihydroxybenzoic acid, trimesic acid, cyanuric chloride, 3,3-bis-(3-methyl-4-hydroxyphenyl)-2-oxo-2,3-dihydroindole, trimesic acid trichloride and α,α',α"-tris-(4-hydroxyphenol)-1,3,5-triisopropylbenzene.

Preferred branching agents are 1,1,1-tris-(4-hydroxyphenyl)-ethane and 3,3-bis-(3-methyl-4-hydroxyphenyl)-2-oxo-2,3-dihydroindole.

The amount of branching agents that may optionally be employed is preferably 0.05 mole % to 2 mole %, referred to moles of bisphenols that are used.

The branching agents may for example in the case of the production of the polycarbonate according to the phase interface process, be added together with the bisphenols and the chain terminators to the aqueous alkaline phase, or may be added, dissolved in an organic solvent, together with the carboxylic acid derivatives. In the case of the transesterification process the branching agents are preferably metered in together with the dihydroxy aromatic compounds or bisphenols.

Catalysts that are preferably used in the production of polycarbonate according to the melt transesterification process are the ammonium salts and phosphonium salts known in the literature (see for example U.S. Pat. No. 3,442,864, JP-A-14742/72, U.S. Pat. No. 5,399,659 and DE-A 19 539 290).

Copolycarbonates may also be used. Copolycarbonates within the context of the invention include polydiorganosiloxane-polycarbonate block copolymers whose weight average molecular weight ($M_w$) is preferably 10,000 to 200,000 g/mole, more preferably 20,000 to 80,000 g/mole (determined by gel chromatography after prior calibration by light scattering measurements or ultracentrifuge measurements). The content of aromatic carbonate structural units in the polydiorganosiloxane-polycarbonate block copolymers is preferably 75 to 97.5 wt. %, more preferably 85 to 97 wt. %. The content of polydiorganosiloxane structural units in the polydiorganosiloxane-polycarbonate block copolymers is preferably 25 to 2.5 wt. %, more preferably 15 to 3 wt. %. The polydiorganosiloxane-polycarbonate block copolymers may be produced for example starting from polydiorganosiloxanes containing α,ω-bishydroxyaryloxy terminal groups and having a mean degree of polymerization Pn of preferably 5 to 100, particularly preferably of 20 to 80.

The polydiorganosiloxane-polycarbonate block polymers may also comprise a mixture of polydiorganosiloxane-polycarbonate block copolymers with conventional polysiloxane-free, thermoplastic polycarbonates, in which the total content of polydiorganosiloxane structural units in this mixture is preferably 2.5 to 25 wt. %.

Such polydiorganosiloxane-polycarbonate block copolymers contain in the polymer chain on the one hand aromatic carbonate structural units (1) and on the other hand polydiorganosiloxanes (2) containing aryloxy terminal groups

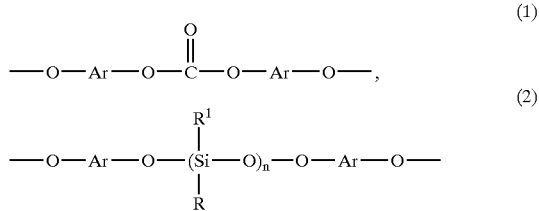

wherein
Ar are identical or different difunctional aromatic radicals and
R and $R^1$ are identical or different and denote linear alkyl, branched alkyl, alkenyl, halogenated linear alkyl, halogenated branched alkyl, aryl or halogenated aryl, preferably methyl, and
n denotes the mean degree of polymerization of preferably 5 to 100, particularly preferably 20 to 80.

Alkyl in the above formula (2) preferably denotes $C_1$–$C_{20}$-alkyl, while alkenyl in the above formula (2) preferably denotes $C_2$–$C_6$-alkenyl; aryl in the above formula (2) is preferably $C_6$–$C_{14}$-aryl. In the above formulae halogenated denotes partially or completely chlorinated, brominated or fluorinated.

Examples of alkyls, alkenyls, aryls, halogenated alkyls and halogenated aryls are methyl, ethyl, propyl, n-butyl, tert.-butyl, vinyl, phenyl, naphthyl, chloromethyl, perfluorobutyl, perfluorooctyl and chlorophenyl.

Such polydiorganosiloxane-polycarbonate block copolymers and their production are described for example in U.S. Pat. Nos. 3,189,662, 3,821,325 and 3,832,419.

Preferred polydiorganosiloxane-polycarbonate block copolymers may be produced for example by reacting polydiorganosiloxanes containing α,ω-bishydroxyaryloxy terminal groups together with other bisphenols, optionally with the co-use of branching agents in the usual amounts, for example according to the two-phase interface process (as described for example in H. Schnell, "Chemistry and Physics of Polycarbonates", Polymer Reviews, Vol. 9, pp. 31–76, Interscience Publishers, New York, London, Sydney, 1964). The polydiorganosiloxanes containing α,ω-bishydroxyaryloxy terminal groups used as educts for this synthesis and their production are described for example in U.S. Pat. No. 3,419,634.

Conventional additives such as for example mold release agents can be mixed with the polycarbonates in the melt or can be applied to the surface. The polycarbonates that are used preferably already contain mold release agents before compounding with the other components of the molding compositions according to the present invention.

As component A there may also be used mixtures of several thermoplastic materials, preferably for example mixtures of polyesters and polycarbonates, particularly preferably of PBT and PC as well as PET and PC.

As Component B) the compositions according to the present invention contain at least one IR-absorbing component, preferably one different from carbon black. Suitable as IR-absorbing component are, according to the present invention, chemical compounds that absorb very strongly in the near infrared region (NIR—wavelength range of the light from 700 to 1200 nm), at least in partial ranges of the NIR, whereas they do not absorb or absorb only weakly in the visible spectrum, and are compatible with the relevant polymers and optionally used additives and reinforcing substances, and are also sufficiently thermostable for compounding, processing such as. injection molding, extrusion and welding. Suitable IR-absorbing compounds are described according to substance classes for example in M. Matsuoka, Infrared Absorbing Dyes, Plenum Press, New York, is 1990. Preferably suitable compounds are those from the substance classes comprising phthalocyanines, naphthalocyanines, perylenes, quaterylenes, metal complexes, azo dyes, anthraquinones, squaric acid derivatives, immonium dyes as well as polymethines. Of these, phthalocyanines and naphthalocyanines are most particularly suitable.

Particularly suitable NIR dyes are phthalocyanines and naphthalocyanines on account of their thermal stability. Phthalocyanines and naphthalocyanines with bulky side groups are preferred on account of the improved solubility in thermoplastics materials.

Particularly suitable as phthalocyanines are compounds of the general formula (I)

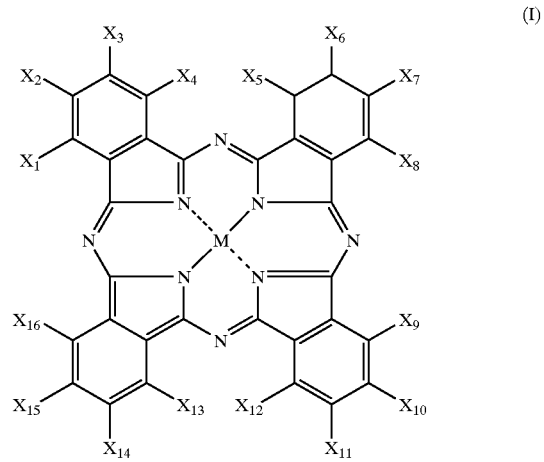

where M is an arbitrary metal centre or hydrogen, preferably VO, Cu, Al, Zn, Ni, HH, $SiR_2$, AlR, Mg, Fe, GaR, MnR, SnR, $Na_2$, $Li_2$, TiO and particularly preferably VO or Cu. In this connection R denotes an aliphatic or aromatic radical, and also alkoxy or aryloxy. $X_1$–$X_{16}$ denote H, halogens, aliphatic or aromatic radicals, as well as alkoxy and/or aryloxy or —S-alkyl and/or —S-aryl or NHalkyl and/or NH-aryl or Nalkyl$_2$ and/or Naryl$_2$ or —NHCOalkyl and/or NHCOaryl. Preferred are bulky radicals such as tert.-butyl, phenoxy or phenyl. According to the present invention $X_1$–$X_{12}$ may preferably include in particular also fluorine and/or chlorine as substituents.

(II)

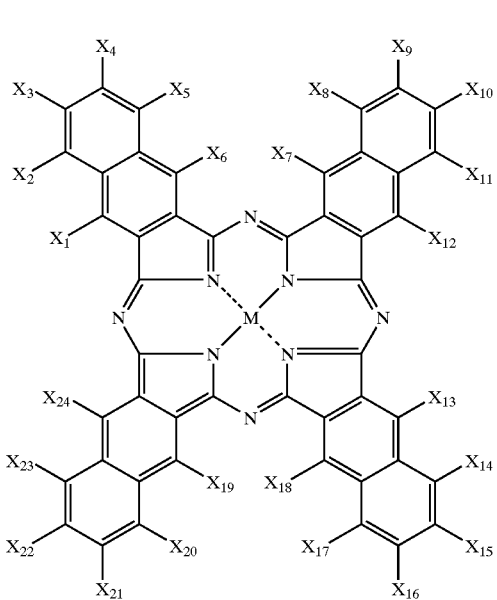

Particularly suitable as naphthalocyanines are compounds of the formula II where M is an arbitrary metal center or hydrogen, preferably VO, Cu, Al, Zn, Ni, HH, SiR$_2$, AlR, Mg, Fe, GaR, MnR, SnR, Na$_2$, Li$_2$, TiO and particularly preferably VO or Cu. In this connection R denotes an aliphatic or aromatic radical, and also alkoxy or aryloxy. $X_1$–$X_{24}$ denote H, halogens, aliphatic or aromatic radicals, as well as alkoxy and/or aryloxy or —S-alkyl and/or —S-aryl or NHalkyl and/or NH-aryl or Nalkyl$_2$ and/or Naryl$_2$ or —NHCOalkyl and/or NHCOaryl. Preferred are bulky radicals such as tert.-butyl, phenoxy or phenyl. According to the present invention $X_1$–$X_{24}$ may preferably include in particular also fluorine and/or chlorine as substituents.

Mixtures of various NIR-absorbers are also suitable.

As Component C) the composition may, according to the present invention, contain fibrous or particulate filler or reinforcing substance or a mixture of two or more different fillers and/or reinforcing substances. Glass fibers, glass beads, glass fabrics, glass mats, whiskers, aramide fibers, potassium titanate fibers, natural fibers, amorphous silicic acid, magnesium carbonate, barium sulfate, feldspar, mica, silicates, quartz, talcum, kaolin, Wollastonite, etc. which may also be surface treated, are added as fibrous or particulate fillers and reinforcing substances for the molding compositions according to the present invention. Preferred reinforcing substances are commercially available glass fibers and glass beads, glass fibers being most preferred.

The glass fibers according to the present invention, which generally have a fiber diameter of between 7 and 18 μm, preferably between 9 and 15 μm, may be added as endless fibers or as chopped or ground glass fibers, in which connection the fibers may be provided with a suitable sizing system and an adhesive or adhesive system, for example based on silane.

The glass beads according to the present invention generally have bead diameters of 10 to 150 μm, preferably 10 to 30 μm, and may be provided with an adhesive system, for example based on silane.

Needle-shaped mineral fillers are also suitable. Within the present invention needle-shaped mineral fillers are understood to mean a mineral filler having a strongly pronounced needle-shaped structure. Wollastonite may be mentioned by way of example. The mineral preferably has an L/D (length/diameter) ratio of 8:1 to 35:1, preferably 8:1 to 20:1. The mineral filler may optionally be surface treated.

The addition of the fillers may take place before, during or after the polymerization of the monomers to form the thermoplastic material of component A). If the addition of the fillers according to the present invention takes place after the polymerization, it preferably takes place by addition to the polymer melt in an extruder. If the addition of the fillers according to the present invention takes place before or during the polymerization, then the polymerization may comprise phases in which the polymerization is carried out in the presence of 1 to 50 wt. % of water or other solvent.

The fillers may during the addition already be present as particles having the particle size that they finally attain in the molding composition. Alternatively, the fillers may be added in the form of precursors from which the particles that ultimately occur in the molding composition are formed during the course of the addition and/or incorporation.

As Component D) the compositions according to the present invention may furthermore contain additives, such as, for example, flame retardants, stabilizers, pigments, processing auxiliaries such as for example lubricants, nucleating agents, rubber-elastic polymers, often also termed impact modifiers, elastomers or rubber, such as, for example, rubbers or polyolefins, etc.

Suitable as flame-retardants are commercially available organic compounds or halogenated compounds with synergists or commercially available organic nitrogen compounds or organic/inorganic phosphorus compounds or red phosphorus. Flame retardant additives such as magnesium hydroxide or hydrated Ca—Mg carbonate, see for example DE-A 4 236 122, may also be used. As halogen-containing compounds, in particular brominated and chlorinated compounds, the following may be mentioned by way of example: ethylene-1,2-bistetrabromophthalimide, epoxidised tetrabromobisphenol A resin, tetrabromobisphenol A oligocarbonate, tetrachlorobisphenol A oligocarbonate, pentabromopolyacrylate and brominated polystyrene. Suitable as organic phosphorus compounds are the phosphorus compounds according to WO-A 98/17720, for example triphenyl phosphate (TPP), resorcinol-bis-(diphenyl phosphate) including oligomers (RDP), as well as bisphenol A-bis-diphenyl phosphate including oligomers (BDP), melamine phosphate, melamine pyrophosphate, melamine polyphosphate and their mixtures. Suitable nitrogen compounds are in particular melamine and melamine cyanurate. Suitable as synergists are for example antimony compounds, in particular antimony trioxide and antimony pentoxide, zinc compounds, tin compounds such as for example tin stannate and borates or iron oxides. Carbon-forming agents and tetrafluoroethylene polymers may also be added.

The molding compositions according to the present invention may contain conventional additives such as agents against thermal decomposition, agents against thermal crosslinking, agents against damage due to ultraviolet light, plasticizers, lubricants and mold release agents, nucleating agents, antistatics, and possibly further stabilizers.

The molding compositions according to the present invention are produced by mixing the respective constituents in a known manner and melt compounding or melt extruding the latter at temperatures between 200° C. and 380° C., generally between 250° C. and 350° C., in conventional equipment such as for example internal kneaders, extruders or double-shaft screw extruders. Further additives such as for example reinforcing substances, stabilizers, lubricants and mold release agents, nucleating agents and other additives may be added during the melt compounding or melt extrusion stage.

Examples of oxidation inhibitors and heat stabilizers include sterically hindered phenols and/or phosphites, hydroquinones, aromatic secondary amines such as diphenylamines, various substituted members of these groups and their mixtures in concentrations of up to 1 wt. % referred to the weight of the thermoplastic molding compositions.

Examples of UV stabilizers that may be mentioned, which are generally used in amounts of up to 2 wt. %, referred to the molding composition, are substituted resorcinols, salicylates, benzotriazoles and benzophenones.

Inorganic pigments such as titanium dioxide, ultramarine blue, iron oxide and furthermore organic pigments such as phthalocyanines, quinacridones, perylenes as well as dyes such as Nigrosin and anthraquinones as well as other coloring agents may be added, in which connection those coloring agents should preferably be used that do not affect too seriously the mechanical properties of the molding composition.

Sodium phenyl phosphinate, aluminum oxide, silicon dioxide, as well as, preferably talcum, may, for example, be used as nucleating agents for partially crystalline thermoplastics materials, such as, for example polyamide 6 or PBT.

Lubricants and mold release agents, which are normally used in amounts of up to 1 wt. %, are preferably ester waxes, pentaerythritol stearate (PETS), long-chain fatty acids (e.g. stearic acid or behenic acid), their salts (e.g. Ca or Zn stearate) as well as amide derivatives (e.g. ethylene-bis-stearylamide) or montan waxes and also low molecular weight polyethylene and/or polypropylene waxes.

As examples of platisizers there may be mentioned phthalic acid dioctyl ester, phthalic acid dibenzyl ester, phthalic acid butylbenzyl ester, hydrocarbon oils and N-(n-butyl)-benzenesulfonamide.

Particularly preferred is the additional use of rubber-elastic polymers (often also termed impact modifiers, elastomers or rubber).

The above are generally copolymers that are preferably built up from at least two of the following monomers: ethylene, propylene, butadiene, isobutene, isoprene, chloroprene, vinyl acetate, styrene, acrylonitrile and acrylic acid and/or methacrylic acid esters with 1 to 18 C atoms in the alcohol component.

Such polymers are described for example in Houben-Weyl, Methoden der Organischen Chemie, Vol. 14/1 (Georg-Thieme-Verlag) Stuttgart, 1961), pp. 392 to 406 and in the monograph of C. B. Bucknall, "Toughened Plastics" (Applied Science Publishers, London, 1977).

Mixtures of various types of rubbers may obviously also be used.

Organic as well as inorganic pigments and/or dyes are suitable as IR-absorbing compounds according to the present invention. Carbon black in very small amounts, such as, <0.1 wt. %, preferably <0.01 wt. %, referred to the total composition, may optionally be a constituent of the pigment mixture. The pigments/dyes and/or carbon blacks may optionally also be used in batch form.

Examples of inorganic pigments include antimony trioxide, antimony pentoxide, basic lead carbonate, basic lead sulfate or lead silicate, lithopone, titanium dioxide (anatase, rutile), zinc oxide, zinc sulfide, metal oxides such as Berlin blue, lead chromate, lead sulfochromates, chromium-antimony titanate, chromium oxides, iron oxides, cobalt blue, cobalt-chromium blue, cobalt-nickel grey, manganese blue, manganese violet, molybdate orange, molybdate red, nickel-antimony titanate, ultramarine blue, as well as metal sulfides such as antimony trisulfide, cadmium sulfide, cadmium sulfoselenides, zirconium silicates, zirconium-vanadium blue and zirconium praseodymium yellow.

Examples of organic pigments include anthraquinone, azo, azomethine, benzanthrone, quinacridone, quinophthalone, dioxazine, flavanthrone, indanthrone, isoindoline, isoindolinone, methine, perinone, perylene, phthalocyaminine, pyranthrone, pyrrolopyrrole and thioindigo pigments, as well as metal complexes of for example azo, azomethine or methine dyes, or metal salts of azo compounds.

Suitable polymer-soluble dyes include for example dispersion dyes such as those of the anthraquinone series, for example alkylamino-, amino-, arylamino-, cyclohexylamino-, hydroxy-, hydroxyamino- or phenylmercaptoanthraquinones, as well as metal complexes of azo dyes, preferably 1:2-chromium or cobalt complexes of monoazo dyes, as well as fluorescent dyes, for example those of the benzthiazole, cumarin, oxarin or thiazine series.

The polymer-soluble dyes may also be used in combinations with fillers and/or pigments, preferably with inorganic pigments such as titanium dioxide.

According to the present invention, pigments and/or polymer-soluble dyes may be used. The dyes or pigments that are used should be compatible with the thermoplastic polymers used according to the present invention and should not adversely affect their mechanical or other properties.

Suitable pigment additives include for example fatty acids with at least 12 C atoms such as behenic acid or stearic acid, their amides, salts or esters such as aluminum stearate, magnesium stearate, zinc stearate or magnesium behenate, as well as quaternary ammonium compounds such as tri-($C_1$–$C_4$)-alkylbenzylammonium salts, waxes such as polyethylene wax, resin acids such as abietic acid, colophony soap, hydrogenated or dimerised colophony, $C_{12}$–$C_{18}$ paraffinic disulfonic acids, or alkylphenols.

Dyes of the pyrazolone, perinone and anthraquinone type, and furthermore of the methine, azo and cumarin type, are preferred according to the present invention.

Also preferred are metal-containing pigments such as the inorganic pigments and the metal complexes of azo, azomethine or methine dyes, azomethine, quinacridone, dioxazine, isoindoline, isoindolinone, perylene, phthalocyanine, pyrrolopyrrole and thioindigo coloring agents and bismuth vanadate.

The present invention also provides for:

Molded parts that can be produced from thermoplastic molding compositions according to the present invention.

Use of molding compositions according to the present invention for the production of molded parts that are joined to other molded parts by laser beam welding.

Assemblies of molded parts that are joined by laser beam welding and in which at least one part consists of the molding composition according to the present invention.

EXAMPLES

Average viscosity PA6 (Durethan B30F, commercial product from Bayer AG) was physically mixed with 30% of glass fibers (CS 7928; commercial product from Bayer AG) and with IR-absorbing compounds optionally in combination with further IR-absorbing compounds, and was then homogeneously colored by compounding in a twin-shaft extruder (ZSK 32 type from Werner & Pfleiderer) at bulk temperatures of 260°–300° C., optionally with the addition of glass fibers.

Low viscosity PBT (Pocan B 1300, commercial product from Bayer AG) was physically mixed with IR-absorbing compounds, optionally in combination with further coloring agents, and homogeneously colored by compounding in a twin-shaft extruder (ZSK 32 type from Werner & Pfleiderer) at composition temperatures of 235°–270° C.

The melt was then spun through a water bath and granulated.

ASTM rods of varying thickness (thickness 0.8; 1.0; 1.6 mm; 3.2 mm; length: 127 mm; width: 12.7 mm) for laser transmission measurements and welding tests.

Examples of the composition and properties of molding compositions according to the present invention and of comparison material are given in Tables 1 to 4.

TABLE 1

Composition of the molding compositions formed from PA

|  |  | Ex.1 | Ex.2 | C. Ex. 1 | Ex. 3 | Ex. 4 | C. Ex. 2 | C. Ex. 3 |
|---|---|---|---|---|---|---|---|---|
| PA6, Additive[1] | [%] | 69.98 | 69.99 | 70 | 69.98 | 69.98 | 100 | 69.8 |
| Carbon black | [%] |  |  |  |  |  |  | 0.2 |
| Glass fiber, Bayer CS 7928 | [%] | 30 | 30 | 30 | 30 | 30 |  | 30 |
| Pro-Jet 860 NP[2] | [%] | 0.02 | 0.01 | 0.00 |  |  |  |  |
| Pro-Jet 830 NP[2] | [%] |  |  |  | 0.02 |  |  |  |
| Excolor 803 K[3] | [%] |  |  |  |  | 0.02 |  |  |

[1]Additive in conventional amounts and constant concentrations (0.01–0.5%): nucleating agent (microtalcum), heat stabilizer (CuI/KBr), mold release agent (montan ester wax)
[2]Commercial product from AVECIA
[3]Commercial product from Ultrasorb Chemikalien GmbH (subsidiary of Nippon Shokubai)

TABLE 2

Composition of the molding compositions formed from PBT

|  |  | Ex. 5 | Ex. 6 | Ex. 7 | Ex. 8 | Ex. 9 | Ex. 10 | Ex. 11 | Ex. 12 | C. Ex. 4 |
|---|---|---|---|---|---|---|---|---|---|---|
| PBT, Additive[1] | [%] | 99.995 | 99.99 | 99.98 | 99.96 | 99.995 | 99.99 | 99.98 | 99.96 | 100.00 |
| Pro-Jet 860 NP[2] | [%] | — | — | — | — | 0.005 | 0.01 | 0.02 | 0.04 | — |
| Excolor 803 K[3] | [%] | 0.005 | 0.01 | 0.02 | 0.04 |  |  |  |  |  |

[1]Additive in conventional amounts and constant concentrations (0.01–0.5%): nucleating agent (microtalcum), heat stabilizer (CuI/KBr), mold release agent (montan ester wax)
[2]Commercial product from AVECIA
[3]Commercial product from Ultrasorb Chemikalien GmbH (subsidiary of Nippon Shokubai)

Non-reinforced PA6 (Durethan B31SK 9000/0; commercial product from Bayer AG) was employed as laser-transparent joining partner in the polyamide tests. ASTM rods 1.6 mm thick were used.

In the case of PBT, non-reinforced PBT (Pocan 1305; commercial product from Bayer AG) was employed. ASTM rods 0.8 mm and 1.0 mm thick were used in this case.

The granules obtained were processed in an Arburg 320-210-500 type injection molding machine under normal molding composition conditions (composition temperatures of 250°–290° C., tool temperatures of 70°–90° C.) into Description of the Implementation and Results of the Laser Transmission Measurements The ASTM test rods fabricated from the IR laser-absorbing and IR laser-transparent material were measured using a transmission measurement arrangement consisting of a spectrophotometer and a photometer bulb which detects directly transmitted light as well as scattered light. For the IR laser-absorbing tests, measurement values of <15% are obtained with test specimen thicknesses of 3.2 mm at least in partial regions of the NIR spectral range between 800 and 1200 nm, whereas the IR laser-transparent material has a transmission level of typically 20–70%.

TABLE 3

Results of the transmission measurements* for PA

| Wavelength [nm] | Specimen Thickness [mm] | Ex. 1 | Ex. 2 | C. Ex. 1 | Exp. 3 | Ex. 4 | C. Ex. 2 | C. Ex. 3 |
|---|---|---|---|---|---|---|---|---|
| 400 | 0.8 | 21.79 | 29.59 | 48.02 | 0 | 12.41 | 55.64 | 0 |
| 500 | 0.8 | 40.66 | 49.87 | 60.64 | 0 | 26.3 | 65.18 | 0 |
| 600 | 0.8 | 49.46 | 58.37 | 66.65 | 0 | 29.86 | 70.68 | 0 |
| 700 | 0.8 | 42.57 | 55.06 | 70.14 | 0.84 | 26.86 | 74.40 | 0 |
| 800 | 0.8 | 23.00 | 40.53 | 72.66 | 24.06 | 22.49 | 77.08 | 0 |
| 900 | 0.8 | 41.01 | 57.91 | 74.86 | 53.34 | 23.91 | 78.25 | 0 |
| 1000 | 0.8 | 67.41 | 73.22 | 76.13 | 71.47 | 32.1 | 79.96 | 0 |
| 1100 | 0.8 | 74.84 | 77.42 | 77.41 | 75.96 | 43.51 | 81.18 | 0 |
| 1200 | 0.8 | 70.53 | 71.91 | 71.29 | 70.44 | 49.95 | 72.88 | 0 |
| | | | | | | | | 0 |
| 400 | 3.2 | 0.11 | 0.51 | 9.00 | 0 | 0 | 18.56 | 0 |
| 500 | 3.2 | 1.53 | 4.00 | 19.91 | 0 | 0.21 | 25.18 | 0 |
| 600 | 3.2 | 3.90 | 8.12 | 24.16 | 0 | 0.44 | 28.07 | 0 |
| 700 | 3.2 | 2.10 | 6.13 | 26.33 | 0 | 0.33 | 30.23 | 0 |
| 800 | 3.2 | 0.16 | 1.72 | 28.28 | 0.23 | 0.16 | 32.43 | 0 |
| 900 | 3.2 | 1.42 | 7.11 | 30.01 | 6.44 | 0.08 | 33.50 | 0 |
| 1000 | 3.2 | 17.64 | 24.50 | 32.43 | 23.77 | 0.6 | 36.32 | 0 |
| 1100 | 3.2 | 28.57 | 35.48 | 35.27 | 31.65 | 2.43 | 38.87 | 0 |
| 1200 | 3.2 | 22.79 | 24.23 | 24.60 | 23.58 | 4.76 | 22.29 | 0 |

*Overall transmission [%], PE Lambda900 measuring instrument, 0°/diffuse, ref. air T = 100%, measurement in some cases with attenuator

TABLE 4

Results of the transmission measurements* for PBT

| Wavelength [nm] | Specimen Thickness [mm] | Ex. 5 | Ex. 6 | Ex. 7 | Ex. 8 | Ex. 9 | Ex. 10 | Ex. 11 | Ex. 12 | C. Ex. 4 |
|---|---|---|---|---|---|---|---|---|---|---|
| 400 | 0.8 | 2.11 | 0.75 | 0.16 | 0.0 | 2.93 | 1.69 | 0.35 | 0.03 | 9.24 |
| 500 | 0.8 | 5.81 | 2.82 | 0.89 | 0.11 | 8.02 | 5.58 | 2.06 | 0.52 | 16.84 |
| 600 | 0.8 | 7.94 | 4.13 | 1.45 | 0.23 | 13.02 | 10.19 | 5.21 | 2.01 | 20.75 |
| 700 | 0.8 | 9.06 | 4.72 | 1.71 | 0.29 | 12.58 | 9.34 | 4.10 | 1.31 | 23.57 |
| 800 | 0.8 | 6.43 | 2.69 | 0.69 | 0.06 | 6.32 | 3.69 | 0.84 | 0.11 | 26.03 |
| 900 | 0.8 | 2.36 | 0.68 | 0.0 | 0.0 | 9.62 | 6.56 | 2.19 | 0.541 | 26.88 |
| 1000 | 0.8 | 8.73 | 4.25 | 1.16 | 0.03 | 26.24 | 24.55 | 21.34 | 16.35 | 28.86 |
| 1100 | 0.8 | 22.22 | 17.46 | 12.34 | 5.15 | 29.73 | 29.04 | 28.02 | 25.54 | 30.65 |
| 1200 | 0.8 | 23.09 | 21.23 | 19.22 | 13.33 | 25.73 | 25.26 | 24.94 | 23.78 | 26.02 |
| 400 | 1.0 | 1.06 | 0.27 | | | | | | | 6.9 |
| 500 | 1.0 | 3.71 | 1.39 | | | | | | | 13.9 |
| 600 | 1.0 | 5.35 | 2.21 | | | | | | | 17.61 |
| 700 | 1.0 | 6.14 | 2.56 | | | | | | | 20.13 |
| 800 | 1.0 | 4.03 | 1.27 | | | | | | | 22.36 |
| 900 | 1.0 | 1.32 | 0.13 | | | | | | | 23.29 |
| 1000 | 1.0 | 6.06 | 2.34 | | | | | | | 25.18 |
| 1100 | 1.0 | 18.27 | 13.26 | | | | | | | 26.78 |
| 1200 | 1.0 | 19.00 | 16.6 | | | | | | | 21.44 |

*Overall transmission [%], PE Lambda900 measuring instrument, 0°/diffuse, ref. air T = 100%, measurement in some cases with attenuator Since all the specimens-comprise a very strongly scattering material, the overall transmission was evaluated as the sum of direct and diffuse transmission.

The specimens corresponding to the comparison examples exhibit a significantly higher transmission than the specimens of Exs. 1–12 colored according to the present invention, which particularly at 800–900 nm and/or 1000–1100 nm (wavelength range of the conventional diodes and Nd:YAG laser) exhibit such a low transmission that they are suitable as absorbing welding partners starting at a thickness of 0.8 mm (PBT) or at a thickness of between 0.8 and 3.2 mm (PA). The overall transmission (consisting predominantly of diffuse radiation fractions) was taken into account in the measurements.

Execution and Results of the Laser Welding Tests

In order to check the suitability of the molding compositions for laser beam welding, welding tests were carried out using an Nd:YAG laser (1064 nm wavelength). The laser-transparent ASTM rods were clamped in a device and joined to one another in an overlapping manner as illustrated in FIG. 1.

In the case of PA, the 0.8 mm thick laser-transparent specimens were passed with a ca. 36 watt laser output and a feed rate of 10 mm/sec once over the whole width of the ASTM rods and welded with a weld seam width of about 1.5 mm. In the case of the 3.2 mm thick PA specimens a laser output of ca. 45 watts was employed.

In the case of the PBT examples, the 0.8 mm and 1.0 mm thick laser-transparent specimens were passed with a ca. 36 to 60 watt laser output and a feed rate of 4 to 6 mm/sec once over the whole width of the ASTM rods and welded with a weld seam width of about 1.5 mm. Details of the test parameters are given in Table 6.

The specimens welded as overlapping seam joints were loaded in a tensile shear test up to fracture as illustrated in FIG. 2.

The measured ultimate tensile stress values for all examples were acceptable to very good.

TABLE 5

Results of the tensile tests on laser beam-welded ASTM specimen bodies of PA; ultimate tensile stress in N

| Material Pairing | | Thickness of the ASTM Specimen | |
|---|---|---|---|
| Material 1* | | Bodies of Material 2* | |
| (thickness) | Material 2 | 0.8 mm | 3.2 mm |
| Comparison 2 | Ex. 1 | 594 | 707 |
| Comparison 2 | Ex. 2 | 777 | 196 |

TABLE 5-continued

Results of the tensile tests on laser beam-welded ASTM specimen bodies of PA; ultimate tensile stress in N

| Material Pairing | | Thickness of the ASTM Specimen Bodies of Material 2* | |
|---|---|---|---|
| Material 1* (thickness) | Material 2 | 0.8 mm | 3.2 mm |
| Comparison 2 | Comparison 1 | Not weldable | Not weldable |
| Comparison 2 | Ex. 4 | 426 | 847 |

*Material 1 denotes in this case the molded part/material that first comes into contact with the laser beam, i.e. is laser-transparent.

TABLE 6

Results of the tensile tests on laser beam-welded ASTM specimen bodies of PBT

| Material Pairing | | Welding Parameters: Laser Output [W]/ Feed Rate [mm/sec] Thickness Material 1 | | Ultimate Tensile Stress [N] Thickness Material 1 | |
|---|---|---|---|---|---|
| Matl. 1* | Matl. 2 | 0.8 mm | 1.0 mm | 0.8 mm | 1.0 mm |
| C. Ex. 4 | Ex. 5 Thickness 1.0 mm | — | 60/6 | — | 265 |
| C. Ex. 4 | Ex. 6 Thickness 1.0 mm | — | 60/6 | — | 299 |
| C. Ex. 4 | Ex. 7 Thickness 1.0 mm | — | 60/5 | — | 212 |
| C. Ex. 4 | Ex. 8 Thickness 1.0 mm | — | | — | 301 |
| C. Ex. 4 | Ex. 9 Thickness 1.6 mm | 51/4 | 60/6 | 141 | 142 |
| C. Ex. 4 | Ex. 10 Thickness 1.6 mm | 51/4 | 60/4 | 164 | 182 |
| C. Ex. 4 | Ex. 11 Thickness 1.6 mm | 51/4 | 60/4 | 165 | 189 |
| C. Ex. 4 | Ex. 12 Thickness 1.6 mm | 51/4 | 60/4 | 227 | 204 |
| C. Ex. 4 | C. Ex. 5 Thickness 1.0 mm Thickness 1.6 mm | 36/5 36/5 | 36/5 36/5 | 428 512 | 382 375 |

*Material 1 denotes in this case the molded part/material that first comes into contact with the laser beam, i.e. is laser-transparent.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A molding composition comprising:
  A) 35 to 99.999 wt. % of a laser-transparent thermoplastic material
  B) 0.001 to 0.1 wt. % of one or more IR-absorbing compound selected from the group consisting of phthalocyanine, naphthalocyanine, perylene, quaterylene, metal complex, azo dye, anthraquinone, squaric acid derivative, immonium dye and polymethine
  C) 0 to 70 wt. % of a mineral filler or reinforcing substance
  D) 0 to 30 wt. % of an additive, and
  E) at Least 1 wt. % of reinforcing substance or filler,
wherein the total composition has a carbon black content of less than 0.1 wt. %.

2. A molded part comprising:
  A) 35 to 99.999 wt. % of a laser-transparent thermoplastic material
  B) 0.001 to 0.1 wt. % of one or more IR-absorbing compound selected from the group consisting of phthalocyanine, naphthalocyanine, perylene, quaterylene, metal complex, azo dye, anthraquinone, squaric acid derivative, immonium dye and polymethine
  C) 0 to 70 wt. % of a mineral filler or reinforcing substance
  D) 0 to 30 wt. % of an additive, and
  E) at least 1 wt. % of reinforcing substance or filler,
wherein the total composition has a carbon black content of less than 0.1 wt. %.

3. A process for the production of molded parts comprising the step of joining two or more molded parts by laser beam welding, wherein the molded parts comprise:
  A) 35 to 99.999 wt. % of a laser-transparent thermoplastic material B) 0.001 to 0.1 wt. % of one or more IR-absorbing compound selected from the group consisting of phthalocyanine, naphthalocyanine, perylene, quaterylene, metal complex, azo dye, anthraquinone, squaric acid derivative, immonium dye and polymethine C) 0 to 70 wt. % of a mineral filler or reinforcing substance D) 0 to 30 wt. % of a conventional additive, wherein the total composition has a carbon black content of less than 0.1 wt. %.

4. Molded parts that have been joined by laser beam welding wherein at least one molded part consists of a thermoplastic molding composition comprising:

A) 35 to 99.999 wt. % of a laser-transparent thermoplastic material

B) 0.001 to 0.1 wt. % of one or more IR-absorbing compound selected from the group consisting of phthalocyanine, naphthalocyanine, perylene, quaterylene, metal complex, azo dye, anthraquinone, squaric acid derivative, immonium dye and polymethine C) 0 to 70 wt. % of a mineral filler or reinforcing substance D) 0 to 30 wt. % of an additive, wherein the total composition has a carbon black content of less than 0.1 wt. %.

5. A composition comprising:

A) 35 to 99.999 wt. % of a laser-transparent thermoplastic material

B) 0.001 to 0.1 wt. % of one or more IR-absorbing compound selected from the group comprising phthalocyanine, naphthalocyanine, perylene, quaterylene, metal complex, azo dye, anthraquinone, squaric acid derivative, immonium dye and polymethine C) 0 to 70 wt. % of a mineral filler or reinforcing substance D) 0 to 30 wt. % of an additive, and E) at least 1 wt. % of a reinforcing substance or filler, wherein the total composition has a carbon black content of less than 0.1 wt. %.

6. The composition according to claim 5, wherein the IR-absorbing compound is a phthalocyanine or a naphthalocyanine.

7. The composition according to claim 5, wherein the thermoplastic material is at least one polyamide or polyester.

8. The compositions according to claim 5, wherein the thermoplastic material is at least one polycarbonate or polyester.

9. A composition comprising:

A) 35 to 99.999 wt. % of a laser-transparent thermoplastic material

B) 0.001 to 0.1 wt. % of one or more IR-absorbing compound selected from the group consisting of phthalocyanine, naphthalocyanine, perylene, quaterylene, metal complex, azo dye, anthraquinone, squaric acid derivative, immonium dye and polymethine C) 0 to 70 wt. % of a mineral filler or reinforcing substance D) 0 to 30 wt. % of an additive, and E) glass fibers, wherein the total composition has a carbon black content of less than 0.1 wt. %.

10. The composition according to claim 9, wherein the IR-absorbing compound is a phthalocyanine or a naphthalocyanine.

11. The composition according to claim 9, wherein the thermoplastic material is at least one polyamide or polyester.

12. The compositions according to claim 9, wherein the thermoplastic material is at least one polycarbonate or polyester.

* * * * *